May 27, 1969    A. I. NELSON ETAL    3,446,635
METHOD AND APPARATUS FOR FREEZE-DEHYDRATION
OF SLICED FOOD MATERIALS
Filed Aug. 10, 1965
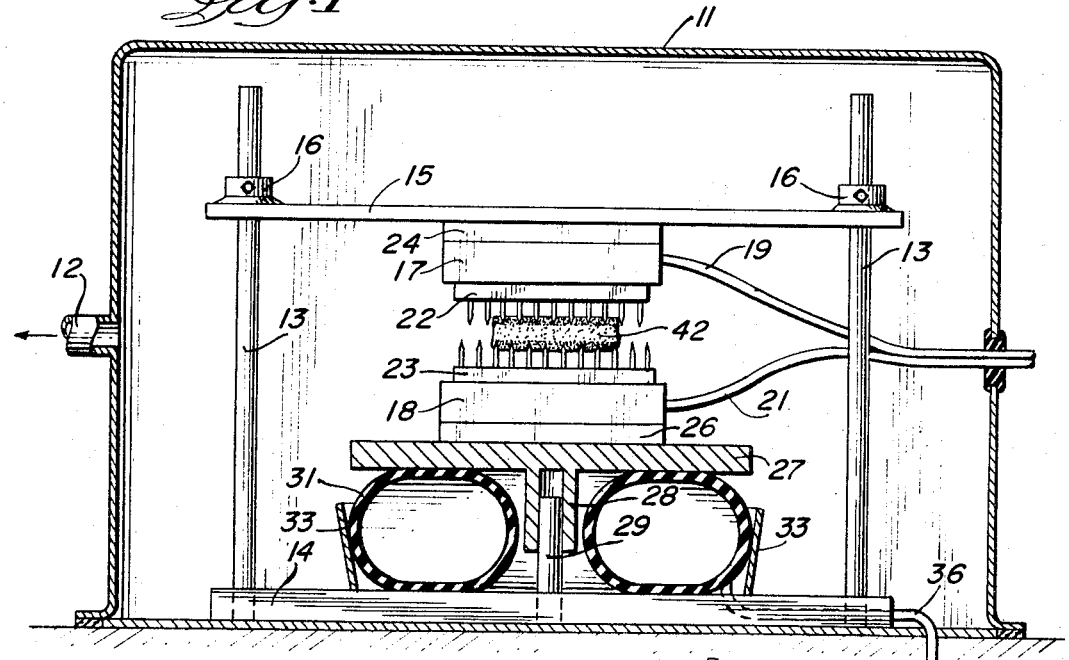
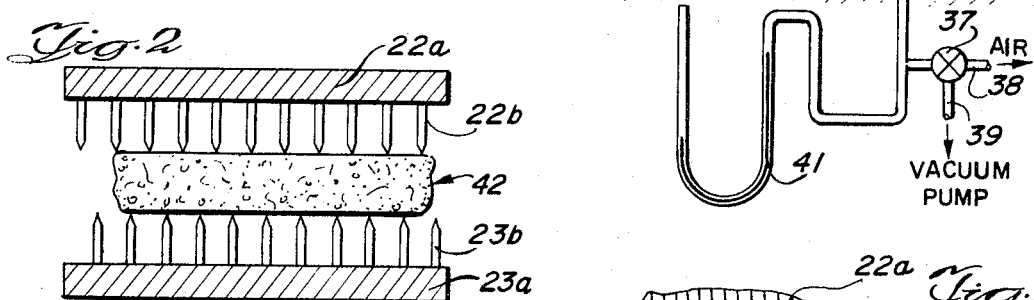
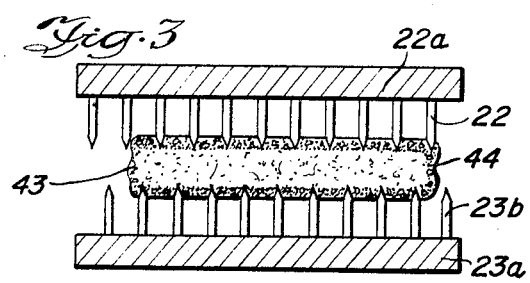
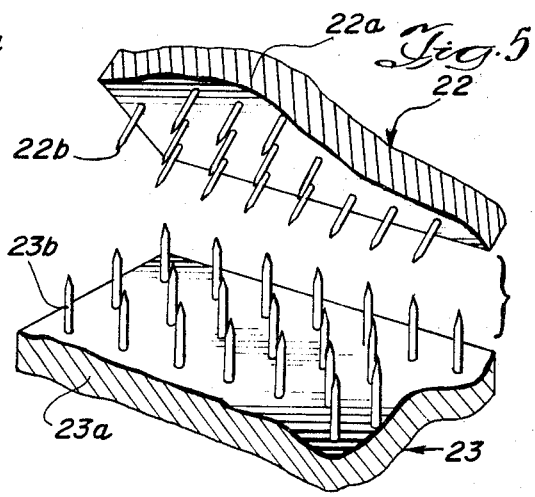
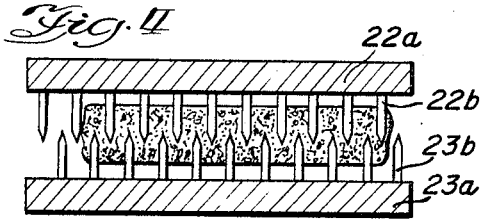
INVENTORS
Alvin I. Nelson
Eugene V. Kwiat
By Merriam, Marshall, Shapiro & Klose
ATTORNEYS United States Patent Office 3,446,635
Patented May 27, 1969

3,446,635
METHOD AND APPARATUS FOR FREEZE-DEHYDRATION OF SLICED FOOD MATERIALS
Alvin I. Nelson, Champaign, Ill., and Eugene V. Kwiat, Minneapolis, Minn., assignors to University of Illinois Foundation, Urbana, Ill., a corporation of Illinois
Filed Aug. 10, 1965, Ser. No. 478,714
Int. Cl. F26b 5/10; A23b 1/04
U.S. Cl. 99—208                                    5 Claims

ABSTRACT OF THE DISCLOSURE

Method and apparatus for freeze-drying sliced food material. The ends of the plurality of heat-conducting pins are maintained in contact with the receding ice front within the slice of material as drying proceeds. A high rate of drying is maintained without sticking of the material to the pins.

---

This invention relates to freeze-dehydration and, more particularly, it relates to an improved method and apparatus for rapid freeze-dehydration of materials in slice form.

Freeze-dehydration of freeze-drying, the removal of moisture from frozen materials at reduced pressure, is generally recognized as the best method for producing dried materials of high quality. For drying certain materials, such as meats and sea-foods, freeze-dehydration is generally regarded as the only known method for producing low-moisture products of extremely high quality. When properly done, freeze-dehydration yields products which rehydrate rapidly and retain the original shape, appearance, and general acceptability of the original material, including high preservation of nutrients.

The biggest disadvantage of freeze-dehydration is the high cost which results from the long drying periods required to dry certain materials to low moisture contents. The long drying period is generally due to the inability to transfer heat to the interior of the frozen material at a rate sufficient to maintain rapid dehydration without damage to the quality of the product, particularly the dried portions through which the heat must be transferred to reach the interior of the product.

The present invention provides a method and apparatus for freeze-dehydration of materials in slice form, particularly food stuffs such as meat, whereby the drying time is cut by 50% or more compared to conventional methods, without adverse effect to the quality of the material. The process is particularly suitable for use in drying relatively thick slices, i.e., slices having a thickness of about ¾ inch, or more, to produce a product having low moisture content with substantially the same porous structure obtained with freeze-dehydration methods heretofore known, but which, in addition, has many extra channels extending into the material, through which rehydration solution can flow, thus producing faster rates of rehydration.

In brief, the invention comprises a method of freeze-dehydration in which a plurality of heat-conducting metal pins or needles are introduced into the product to be dried and are inserted gradually more deeply into the slice as dehydration continues so as to keep contact with the gradually receding ice front within the material. These pins provide high-conduction pathways for the heat energy required for sublimation of the ice, so that a high rate of sublimation can be maintained without the heat damage which would otherwise occur.

The invention will be better understood from the following detailed description thereof, taken in conjunction with the accompanying drawings, in which:

FIGURE 1 is a schematic representation of one embodiment of the invention showing apparatus for supplying heat through heat-conductive pins which maintain contact with the receding ice front in a slice or slab of frozen material as dehydration progresses;

FIGURE 2 is an enlarged representation of the heat conductive pins in contact with the surface of a frozen slice of material at the start of a dehydration run;

FIGURE 3 is a representation of the pins of FIGURE 2 at an intermediate stage in the dehydration process showing the ends of the pins in contact with the receding ice front;

FIGURE 4 is a representation of the end of a dehydration run showing the pins fully inserted in the dried material, which now has no ice content; and FIGURE 5 is an enlarged perspective representation of a portion of the heat conductive pin system shown in FIGURES 1–4.

In accordance with the method of the invention, a slice of frozen material, particularly a foodstuff, such as meat, and especially a slice having a thickness of ¾ inch or more, is initially frozen and then maintained in a cooled, evacuated zone wherein a total pressure below about 4 millimeters of mercury is maintained, while heat is supplied to the ice front within the frozen slice by conduction through a plurality of sharpened pins or needles which are inserted into the sides of the slice and maintained in contact with the receding ice front. The frozen interior of the meat slice is relatively hard and dense, whereas the dried surface layer is relatively light and porous, with decreased resistance to penetration. Accordingly, moderate pressure (e.g., about 3–4 pounds per square inch of meat surface) on the pins or needles will cause the needles to penetrate gradually deeper into the slice as dehydration proceeds, maintaining contact with the receding ice front.

Suitable apparatus for practicing the method of the invention is depicted in FIGURE 1. The apparatus comprises an evacuated chamber 11 equipped with a conduit 12 leading to a suitable vacuum pump (not shown) for maintaining within the chamber a suitably low pressure for freeze-dehydration, on the order of 4 millimeters of mercury or less. Within the evacuated chamber is a framework comprising support rods 13, base plate 14, and cover plate 15, which is held in place by mounting flanges 16. Electric heating elements 17 and 18, provided with power through cables 19 and 21 leading to a suitable source of power (not shown), are in contact with pin assembles 22 and 23 positioned between the heating plates. Insulation layers 24 and 26, typically made of asbestos, are provided to limit the flow of heat away from the heating plates. The entire pin and heating plate assembly is supported on platform 27 equipped with flange 28 which is free to rise and fall about guidepost 29. Toroidal rubber bladder 31, held in place by circular retainer plate 33, is provided with conduit 36, valve 37, and conduits 38 and 39 leading to the external atmosphere and a vacuum pump respectively. U-tube manometer 41 is provided for measuring the pressure within the bladder.

As shown in detail in FIGURE 5, pin assembles 22 and 23 are identical and consist of plates 22a and 23a provided with a plurality of sharpened pins or needles 22b and 23b, arranged in overlapping relationship as shown in FIGURES 2, 3, and 4. Both plates 22a and 23a and pins 22b and 23b are made of a heat-conducting metal, such as steel drill stock, which has the necessary mechanical strength and suitably high heat conductivity.

The operation of the apparatus of FIGURE 1 is as follows. The slice of material to be dried, 42, in frozen condition, is inserted between the pins in assemblies 22 and 223. The pressure within the chamber 11 is evacuated through conduit 12 to a suitably low value below about 4 millimeters and plates 22 and 23 are heated to a temperature suitably within the range of about 125–250° F. or more. By manipulation of valve 37, atmospheric air is permitted to enter bladder 31 which expands and causes an upward force to be exerted on platform 27, thus causing pins 22b and 23b to enter the frozen slice 42 to an extent determined by the total upward force which is applied. As an alternative to the use of bladder 31, any means such as springs, pneumatic or hydraulic cylinders and the like, can be used to create the necessary force for this purpose. Plates 22 and 23 are heated by conduction from heating plates 17 and 18, the heat passing into the interior of slice 42 by conduction through pins 22b and 23b.

As shown in FIGURES 2, 3, and 4, at the beginning of a dehydration cycle, the ends of the pins 22b and 23b are in contact with the surface of the frozen slice 42, which is relatively hard. At an intermediate stage in the drying cycle (FIGURE 3), the ice front 43 has receded toward the interior of the slice. The dried external layer 44, being relatively light and porous, is readily penetrated by the ends of the pins which maintain a position in contact with the receding ice front and permit heat to be supplied by conduction through the pins to the ice zone, thereby maintaining the sublimation of ice to vapor. At the end of the run, depicted in FIGURE 4, the internal ice has been entirely sublimated and the needles 22b and 23b have penetrated from each side to a depth slightly more than half the total thickness of the slice.

The method of the invention permits the dehydration of foodstuffs in sliced form to low residual moisture contents on the order of 2% or less with a reduction in the necessary time required of 50% or more compared to the time necessary using a conventional flat heated plate for providing the heat of sublimation. This increased drying rate is achieved without any adverse effect on the quality of the dried product. The dried product is readily removed from the heat conductive pins. Sticking is avoided because the pins are penetrating through dry tissue.

The fine holes produced by the heat conductive metals provide avenues for rehydration solution to enter the dried material during rehydration more rapidly than in the case of conventionally dried products, thereby reducing the rehydration time. In addition, the holes in the product swell shut during rehydration and are practically invisible in the rehydrated product and particularly so in a product which is cooked before use, such as beef steak.

The size and positioning of the pins in the pin assemblies depend on the thickness, nature, and size of the material to be dried. For meat slices, suitable pins can be made from 1/16 inch diameter metal rod or similar material cut in lengths of ½ inch to 1½ inches, depending on the thickness of the slice, and suitably sharpened on the end which penetrates the product. Uniform or non-uniform spacing between needles, with spacing distances on the order of ½ inch or less to 1 inch or more can be used, with the closer spacing resulting in faster and more uniform drying. When two sets of pins or needles are used, entering the material from opposite sides, the needles in one set are preferably off-set from the other so that, when the plates are brought together, the resulting spacing at the center of the slice between the pins in one plate and the pins in the second plate is less than the spacing on the individual plates.

The foregoing detailed description has been given for clearness of understanding only, and no unnecessary limitations should be understood therefrom, as modifications will be obvious to those skilled in the art.

What is claimed is:

1. A method for freeze-dehydrating a food material in slice form which comprises maintaining said material in frozen condition under temperature and pressure conditions suitable for sublimation of ice, applying the ends of a plurality of heat-conducting pins to a surface of said frozen material so as to contact said surface without penetrating the frozen interior of said material, supplying heat through said pins to said material to cause sublimation of the ice in said material and the recession of the ice front away from said surface, and keeping the ends of said pins in contact with said receding ice front during the dehydration process, and readily removing the dried material from the heat conducting pins whereby the holes produced in the material by said pins provide avenues for rehydration solution to enter the dried material during rehydration thereof and are practically invisible in the rehydrated material.

2. The method of claim 1 wherein said heat conductive pins are inserted into said material through two opposed surfaces.

3. The method of claim 1 wherein said material is in the form of a slice having a thickness greater than about 0.75 inch.

4. A method for freeze-dehydrating meat in the form of slices having a thickness greater than about 0.75 inch which comprises maintaining said slices in frozen condition at a pressure below about 4 millimeters of mercury, applying the ends of a plurality of heat-conducting pins, said pins having a spacing of about 0.5–1 inch to the surface of said frozen meat so as to contact said surface without penetrating the frozen interior of said material, heating said pins to a temperature within the range from about 125°–250° F. to cause sublimation of the ice in said meat and the recession of the ice front away from said surface, and keeping the ends of said pins in contact with said receding ice front during the dehydration process and readily removing the dried meat from the heat conducting pins whereby the holes produced in the meat by said pins provide avenues for rehydration solution to enter the dried meat during rehydration thereof and are practically invisible in the rehydrated meat.

5. Apparatus for freeze-dehydration of frozen water-bearing food materials in slice form comprising an evacuable chamber, means for evacuating said chamber to a low pressure, a pin assembly comprising a plurality of heat-conducting pins situated within said chamber in contact with said material to be dried, heating means for heating said pins and biasing means for urging said pins into the interior of said material, said biasing means including an inflatable bladder located within said evacuable chamber, the interior of said bladder communicating with the atmosphere external of said chamber, whereby said bladder expands when said chamber is evacuated and exerts sufficient force on said pins to cause them to maintain contact with the ice front in the frozen interior of said material during dehydration.

References Cited

UNITED STATES PATENTS 2,930,139    3/1960    Braynko et al. _____ 99—208 X
3,222,796    12/1965    Jeppson.

HYMAN LORD, *Primary Examiner.*

U.S. Cl. X.R.

34—5, 92; 99—199, 208